Sept. 25, 1951 L. E. SMITH 2,569,201
DRAFT AND LIFT MECHANISM FOR POTATO DIGGERS
Filed Nov. 7, 1946 5 Sheets-Sheet 1

Inventor
Lewis E. Smith
By
Paul O. Pippel
Atty

Sept. 25, 1951 L. E. SMITH 2,569,201
DRAFT AND LIFT MECHANISM FOR POTATO DIGGERS
Filed Nov. 7, 1946 5 Sheets-Sheet 2

Fig. 2.

Inventor
Lewis E. Smith
By Paul O. Pippel
Atty.

Sept. 25, 1951 L. E. SMITH 2,569,201
DRAFT AND LIFT MECHANISM FOR POTATO DIGGERS
Filed Nov. 7, 1946 5 Sheets-Sheet 3

Inventor
Lewis E. Smith
By Paul O. Pippel
Atty

Sept. 25, 1951  L. E. SMITH  2,569,201
DRAFT AND LIFT MECHANISM FOR POTATO DIGGERS
Filed Nov. 7, 1946  5 Sheets-Sheet 5

Inventor:
Lewis E. Smith
By: Paul O. Pippel
Atty.

Patented Sept. 25, 1951

2,569,201

UNITED STATES PATENT OFFICE 2,569,201

DRAFT AND LIFT MECHANISM FOR POTATO DIGGERS

Lewis E. Smith, Congress Park, Ill., assignor to International Harvester Company, a corporation of New Jersey Application November 7, 1946, Serial No. 708,229

10 Claims. (Cl. 55—9)

This invention relates to a potato digger. More specifically, it relates to an improved construction for moving a power driven potato digger to and from a ground digging position.

The type of potato digger or harvester with which the present invention is concerned is generally connected to and drawn behind a mobile power unit such as a tractor. The digger is provided with a frame supported on ground wheels and has at its forward end a digging shovel. A shaker conveyor is generally mounted for longitudinal movement on the frame and is connected by means of a driving mechanism to the power take-off of a tractor.

During the operation of the digger, it becomes desirable to raise and lower the digger shovel either for the purpose of depth adjustment or to lift the same into a transport position. A lifting unit, such as a hydraulic system on the tractor, may be utilized for accomplishing this purpose.

Considerable power effort on part of the tractor is generally necessary to move a digger of this type. The digger may be worked under hard ground conditions and the weight of the machine thus makes it necessary for the tractor to exert considerable draft power. For the same reasons, the lifting means employed is also required to exert a great deal of force in moving the digger shovel out of the ground digging position.

The type of lifting linkage employed between the tractor and the digger has in the past generally been of such construction that the lifting force utilized had to assume the draft power during the lifting operation. In order to accomplish lifting of the digger shovel, it has been common in most constructions to employ a jack knife type or toggle construction connected between the tractor draw-bar and the draft structure of the implement. Then by employing a lifting cylinder in conjunction with the toggle linkage, lifting of the digger shovel is accomplished. It is of course obvious in a jack-knife or toggle linkage draft construction that there are two points of connection, one at the draw-bar and one at the implement to be raised. The lifting force is generally connected near the pivotal connection of the links and in making this point the two points of connection are brought toward one another. Therefore when lifting, in constructions of this kind, the potato digger is drawn closer to the tractor. Stated in another manner, the distance between the digger shovel and the transverse axis of the rear wheels of the tractor is decreased as the digger is drawn toward the tractor by virtue of the lifting cylinder and the action of the toggle or jack-knife linkage.

From this fact, therefore, it is obvious that the power means, or lifting cylinder employed, must in addition to its lifting action assume the draft force which the tractor exerts in moving the digger forwardly. This is true geometrically in a toggle, jack-knife or parallel linkage construction.

As has been indicated the force required to break the implement from the ground is exceptionally great, and therefore it is especially undesirable to require the lifting means to perform additional work. In all the previous constructions, however, the lifting mechanism had to assume certain draft forces since the action of the lifting linkage employed would draw the implement closer to the tractor during lifting.

It is the prime object of this invention, therefore, to provide an improved means for controlling the working depth of an agricultural implement and for lifting the same from a ground working to a transport position.

It is another object to provide an improved lifting linkage for a tractor drawn implement, said linkage being constructed and arranged to raise and lower said implement from the ground while maintaining the normal longitudinal draft distance between the tractor and the implement.

It is another object to provide an improved construction for lifting a tractor drawn implement out of a ground working position, said construction including a novel linkage arrangement whereby the digging portion of the implement may be raised while maintaining the draft distance between the implement and the tractor.

It is still another object to provide an improved lifting linkage for a tractor-drawn potato digger, said lifting linkage being operable to raise the nose or shovel of the digger substantially vertically out of the ground during forward movement of the digger and the tractor.

It is still another object of the invention to provide a hydraulic lifting linkage for controlling the working depth of a tractor drawn potato digger, said linkage including non-parallel links operable to raise the potato digger shovel without substantial forward movement of the digger with respect to the tractor.

It is a further object to provide an improved caster wheel construction for a tractor drawn potato digger.

It is a still further object to provide an improved construction for simultaneously raising the adjustable discharge end of a potato digger upon the raising of the digger shovel or nose from a ground working position.

It is still another object to provide an improved drive construction for a potato digger, said drive construction including a telescoping shaft which is in operative connection with a gear box mounted on the adjustable discharge end of the potato digger, said gear box being pivotally mounted whereby upon raising and lowering of the discharge end a substantially straight line of driving connection will be maintained through the telescoping drive.

It is another object to provide an improved drive connection between a tractor and a tractor drawn potato digger.

Other objects and features of the present invention will become apparent from a reading of the following specification when examined in conjunction with the drawings, in which.

Referring particularly to Figs. 1, 2, 3 and 4, the rear portion of a mobile power unit, such as a tractor, is generally designated by the reference character 10. The tractor consists of a body portion 11 carried by an axle structure 12 to which are connected rear ground wheels 13, only one of which is shown. A draw-bar structure 14 is connected to the axle structure 12. A power take-off shaft 15 projects rearwardly from the body 11, the forward end of the shaft being suitably connected to the power source of the tractor (not shown). An operator's station 16 is positioned on the rear of the tractor 10.

A potato digger designated generally by the reference character 20 is pivotally connected to the draw-bar structure 14 and is adapted to be drawn by and behind the tractor 10. For the purpose of the present disclosure a one row type of potato digger is illustrated though the invention applies equally well to a digger capable of digging more than one row. The digger 20 includes a frame 21 carried by a transverse axle 22 pivotally mounted on ground wheels 23. The frame 21 includes a pair of downwardly extending spaced angle members 24. The angle members 24 provide a guide and support for the endless shaker conveyor 25 which is carried on a plurality of idler wheels 26 mounted on various positions on the frame 21. A digging or ground engaging shovel 27 is positioned at the foremost portion of the frame 21.

An adjustable discharge section 28 is provided at the rear of the frame 21. The discharge section 28 comprises a pair of spaced downwardly extending angle members 29 which are pivotally connected to the rear portion of the frame 21 as indicated by the reference character 30. A vertical bail element 31 is connected to the angle member 29.

Figure 6:
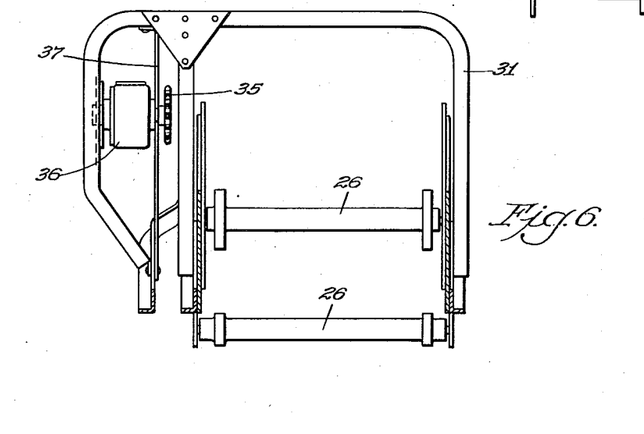
Fig. 6 is a sectional view of a rear portion of a tractor drawn potato digger, said view being taken on line 6—6 of Fig. 1.

The rear portion of the discharge section 28 supports a transverse shaft 32 on which is mounted a pair of driven sprockets 33 (only one of which is shown), which drive the endless conveyor 25. A drive sprocket 33' is driven by drive chain 34 which in turn is driven by the sprocket 35. The drive sprocket 33' is effective to drive the endless conveyor 25. The sprocket 35 is keyed to a power output shaft 35' which is driven by means of gearing (not shown) within the gear box 36, said gear box best being shown in Fig. 6. The gear box 36 is mounted for pivotal movement between a vertical member 37 and a vertically extending arm of the bail member 31.

Figures 1, 5:
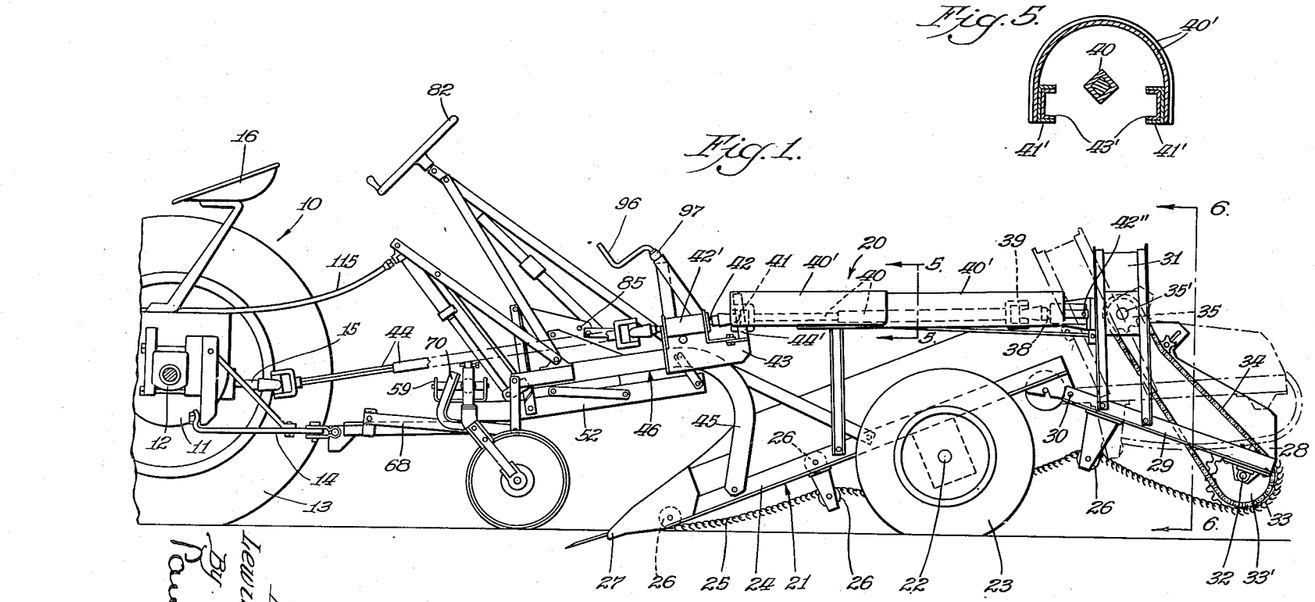
Fig. 1 is a side elevational view of a tractor and a tractor drawn potato digger showing the digger shovel or nose in a ground digging position.
Fig. 5 is a sectional view of a portion of a telescoping drive for a potato digger taken along the line 5—5 of Fig. 1.
Figure 2:
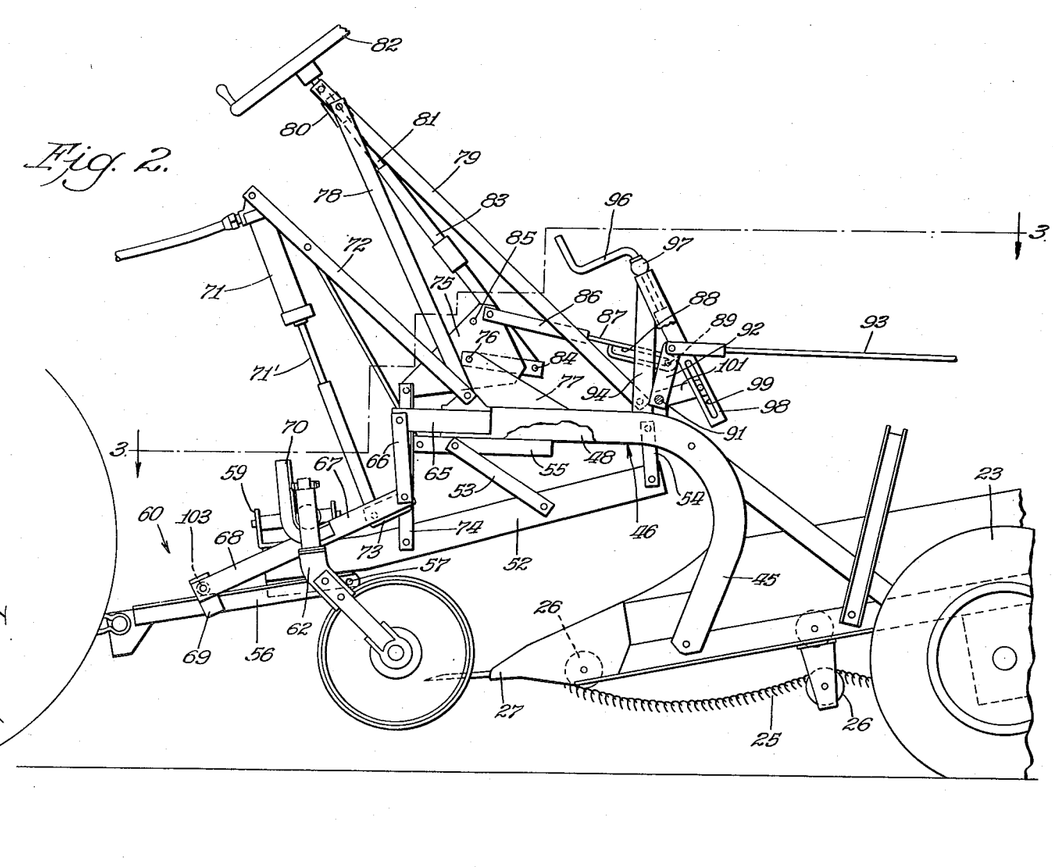
Fig. 2 is a side elevational view of a tractor drawn potato digger, said view showing the position of an improved lifting linkage after the digger shovel has been lifted from the ground.

As best shown in Fig. 1, a power input stub shaft 38 projects forwardly out of the gear box 36 and is connected by means of a universal joint 39 to a pair of telescoping members 40, the foremost one of which is also provided with a universal joint 41. The universal joint 41 is in operative connection with a short shaft 42 pivotally connected by means of a bearing 42' to a bracket 43. The short shaft 42 is in driving connection with a universal linkage 44 which is connected to the power take-off shaft 15 of the tractor 10. As best shown in Figs. 1 and 2, a pair of telescoping shields 40' are provided to cover the telescoping shafts 40. The rear shield 40' is connected, as best shown in Fig. 5, to a pair of channels 41' which are connected at their rearmost ends to a portion of the gear box 36, as indicated at 42'. The foremost shield 40' is similarly connected to a pair of channels 43' which have their forward ends connected to a bracket 44' connected to the bracket 43. The shields 40' and channels 41' and 43' are in telescoping relation and serve to support the telescoping members 40.

Figure 3:
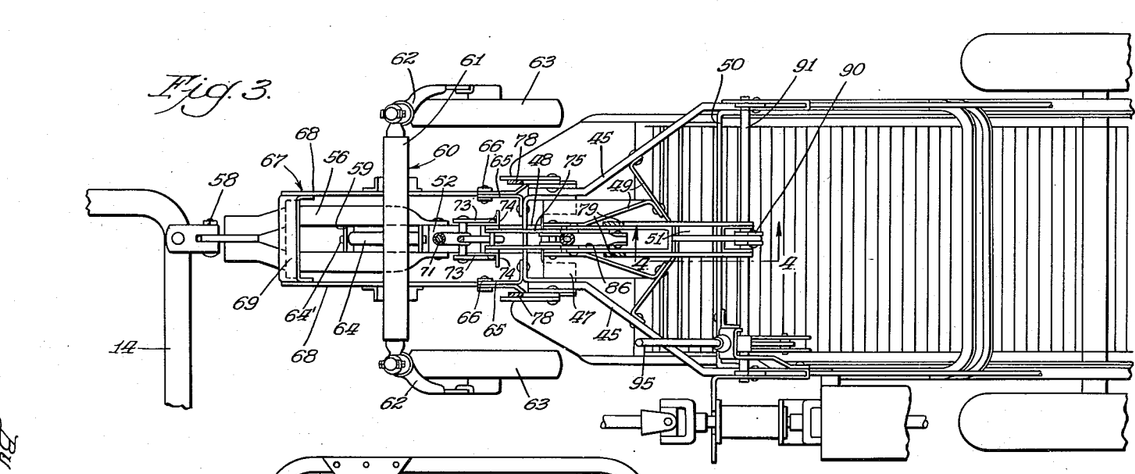
Fig. 3 is a sectional plan view of a portion of a tractor drawn potato digger taken along the line 3—3 of Fig. 2.
Figure 4:
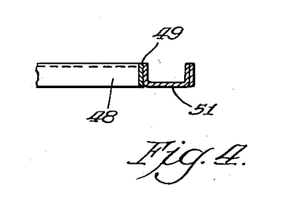
Fig. 4 is a fragmentary sectional view taken along the line 4—4 of Fig. 3.
Figure 10:
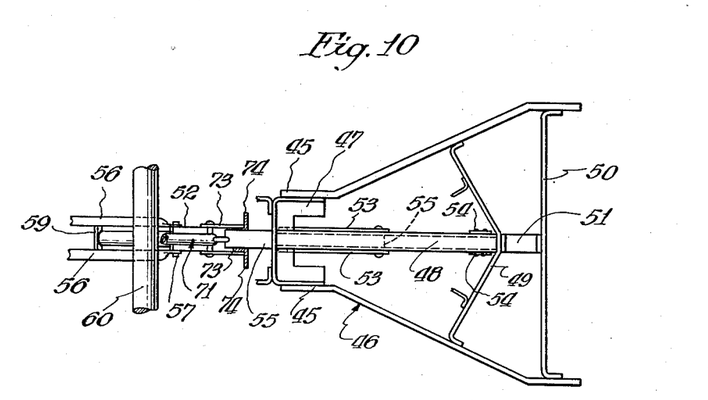
Fig. 10 is a plan view taken substantially along the line 10—10 of Fig. 9 showing portions of the lifting linkage for adjusting the working depth of the potato digger shovel.

The bracket 43 is rigidly connected to one of a pair of upwardly and forwardly extending spaced supports 45, which are connected to the angle members 24. The supports 45 form the main draft frame 46 of the potato digger. As best shown in Figs. 3 and 10, the forward ends of the supports 45 are rigidly secured to an angle 47 bent into the shape of a U. A channel or longitudinally extending lifting member 48 with the legs pointing downwardly is rigidly fastened to the angle 47, and at its rearward end, as indicated in Figs. 4 and 10, is connected to a brace structure 49. The brace structure 49 is further connected to a transversely extending support 50 by means of a bracket 51. It can thus be seen that a rigid frame structure is provided that will absorb the stress loads developed in lifting the potato digger from its ground working position.

A box-type draft beam 52 is positioned beneath the supports 45 and frame 46 and extends forwardly with respect thereto. The box-type draft beam 52 is movable with respect to the supports 45 and frame 46 and by means of non-parallel links 53 and 54. As best shown in Figs. 1 and 2, the rear links 54 are shorter than links 53 and are pivotally connected to the channel member 48. The forward links 53 are longer than the links 54 and are pivotally connected to a member 55 rigid with the supports 45 and the channel member 48.

It is of prime importance to note the difference in the length of the links 53 and 54 which by virtue of their construction movably connect the box-type draft beam 52 and the channel or longitudinally extending lifting member 48 of the frame 46 in non-parallel relation. This non-parallel relation is significant in the novel manner in which the digger shovel is moved from the ground without fore-shortening of the distance between the digger and the tractor, as will be presently described.

A member or draw-bar extension 56 is pivotally connected at one end to the box-type draft beam 52, as indicated at 57. The forward end of the member 56 is pivotally connected to the draw-bar structure 14, as indicated at 58.

A U-shaped member 59, mounted on the forward end of the box-type draft beam 52, pivotally supports a caster wheel structure 60. The caster wheel structure 60 comprises a yoke 61 having downwardly extending arms 62 which support and permit pivotal or castering movement of the caster wheels 63. The yoke 61 is mounted for teetering movement by means of a bearing 64 which is journalled on a pin 64' carried by the U-shaped member 59.

Connected to each of the supports 45 and projecting forwardly thereof is a bracket 65. Each bracket 65 pivotally supports a pair of links 66, as best shown in Figs. 2 and 3. The links 66 are pivotally connected to a rectangular structure 67 which comprises side members 68 and a U-shaped bracket 69 which straddles and rests upon the draft member 56. The links 66 and the structure 67 in effect form a toggle linkage. An L-shaped angle 70 is connected to each side member 68 and functions to form a cradle for retaining the caster wheel structure against pivotal movement when the caster wheels and the digger are raised as shown in Fig. 2.

A hydraulic lifting cylinder or fluid actuated extensible means 71 is connected to a triangular frame 72 which is rigidly connected to the supports 45. The piston rod 71' of the cylinder 71 is connected at its free end to and between a pair of spaced brackets 73 which in turn are rigidly fastened to a pair of vertical lifting links 74 spacedly and pivotally connected at their lower ends to the box-type beam 52. The member 55 projects between the links 74 and acts as a guide when lifting movement takes place, as will become more apparent from the operation.

The upper ends of the lifting links 74 are pivotally connected to a pair of spaced triangular plate members 75 which are pivoted as at 76 between a pair of vertical plates 77 rigidly connected to the supports 45.

A triangular brace structure comprising a pair of forward legs 78 and a pair of rearward, spaced members 79 is rigidly mounted on the supports 45. A bearing member 80 is pivotally connected to the uppermost junction of the legs 78 and the spaced members 79. A shaft 81 has at its upper end a manual adjusting wheel 82. The shaft 81 is journalled in the bearing member 80 and threads into a tubular member 83 which is connected to a link 84. The link 84 is pivoted between the triangular plates 75 as indicated at 76 and is adapted to engage a pin 85 transversely extending through the plates 75 for imparting adjusting movement thereto.

As best shown in Figs. 2 and 3, a bail member 86 is connected to the triangular plates 75. The bail member 86 has connected thereto a link 87 having a lost motion loop 88. A transverse pin 89 extends through the loop 88 and is connected to a pair of vertical members 90 best shown in Fig. 3, which are keyed to a transverse shaft 91 pivotally mounted in the supports 45. At each end of the shaft 91 is keyed a vertical element 92 which in turn is connected to a pair of longitudinal links 93 which, as shown in Fig. 1, extend rearwardly and are connected to the adjustable discharge end of the digger.

A vertical support 94 is mounted on the left-hand side of the digger. The support 94 mounts a manual adjusting means 95 for independently raising and lowering the adjustable discharge end of the digger. The manual adjusting means 95 includes a crank-arm 96 journalled in a bearing 97. The lower end of the crank-arm 96 is in threaded connection with a link 98 having a lost motion slot 99. A pin 100 rides in the slot and is connected to an arm 101 which is keyed to the shaft 91.

Figure 7:
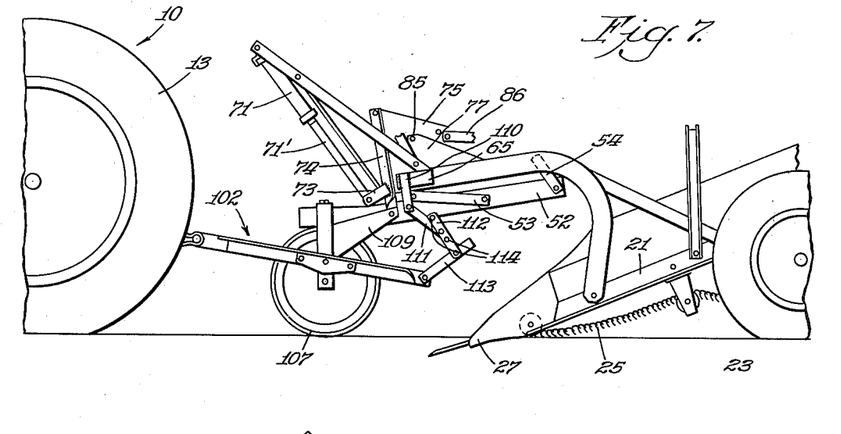
Fig. 7 is a side elevational view of a modified form of a tractor drawn potato digger in a ground engaging position.
Figure 8:
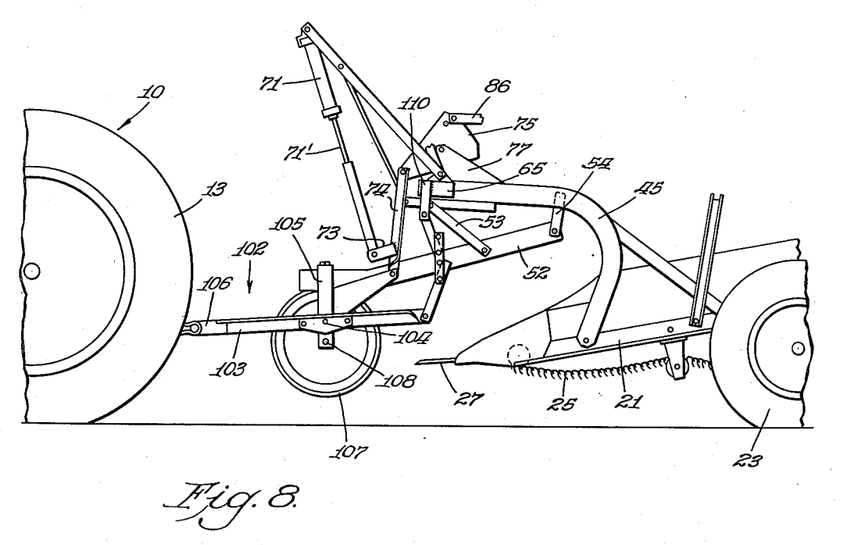
Fig. 8 is a side elevational view of the same in a transport position.
Figure 9:
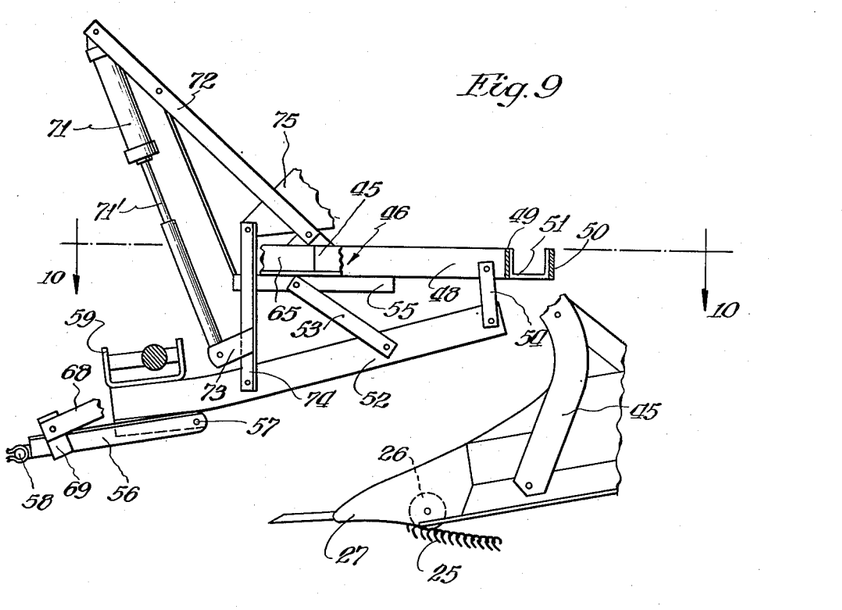
Fig. 9 is a side elevational view similar to Fig. 2, this view, however, having portions of the structure removed to show detail parts of the lifting linkage for adjusting the potato digger shovel.

The digger shown in Figs. 7 and 8 shows a modification in the draft and lifting connection between the digger and the tractor. Similar parts are indicated by the same reference characters. In the potato digger shown in Figs. 7 and 8, the caster wheel structure is not utilized and is replaced by a roller truck member generally indicated by the reference character 102. The truck 102 includes a longitudinal U-shaped frame or draw-bar extension 103 which is pivotally attached as at 104 to a vertical bail member 105. The vertical bail member is rigidly attached to the draft beam 52. A hitch connection 106 suitably connects the frame 103 to the drawbar of the tractor. A roller wheel 107 is journalled on a shaft 108 extending transversely through the legs of the bail member 105. A pair of gussets 109 (only one of which is shown) rigidly secure the legs of the bail member 105 to the beam 52.

The brackets 65 of the modification shown in Figs. 7 and 8 each have connected thereto a member 110 to which is pivotally connected a link 111. The link 111 is in turn pivotally and centrally connected to toggle links 112 and 113. Toggle link 113 is pivotally connected to toggle link 112 and to each leg of the U-shaped frame 103. The toggle link 112 is provided with pins or stops 114 which limit forward travel of the links when lifting the digger, as will be presently described.

Operation

As best shown in Fig. 1, the potato digger 20 is drawn along by the tractor 10 with the shovel 21 digging into the ground. The sprocket 35 is driven by means of the gear box and the telescoping members 40 which in turn are driven from the power take-off shaft of the tractor. The chain 34 actuates the sprocket 33 which in turn drives the shaker conveyor 25. After the potatoes have been dug, the conveyor 25 shakes off the excess soil and carries them to the adjustable discharge section 28, whereupon the potatoes are returned to the ground.

As best shown in Figs. 1, 2 and 3, the caster wheels regulate the depth of the digger shovel 27. The caster wheels ride in the furrows at each side of the ridge and by virtue of the center oscillating or teetering connection are free to oscillate when encountering uneven ground, thereby providing smooth and even digging action by the digger. The downward thrust occasioned by the digging is upon the caster wheels.

Raising and lowering of the digger shovel may be accomplished with ease by the operator from his station on the tractor. When the operator desires to raise the potato digger shovel from the ground or to adjust the same, he can do so by means of a hydraulic lifting arrangement mounted on the tractor. The type of lifting arrangement which may be utilized is shown in the patent to C. W. Mott 2,324,866, dated July 20, 1943. Fluid is supplied from a hydraulic pump (not shown) mounted on the tractor to a conduit 115 which is in communication with the hydraulic cylinder 71. The piston rod 71' thereupon presses downwardly upon the spaced brackets 73 thereby exerting a downward thrust upon the lifting links 74. The downward thrust on the lifting link 74 forces the box beam 52 downwardly against the caster wheel structure. Continued hydraulic action causes the non-parallel links 53 and 54 to raise the longitudinally extending lifting member which is connected to the supports 45 and thus raise the digger shovel. The downward thrust, therefore, of the lifting link 74 is initially taken upon the caster wheel structure 60. Thus as the hydraulic pressure increases, the supports 45 and lifting member 48 pivot about the pivotal points of the non-parallel links 53 and 54, and the supports thereupon are urged upwardly causing the shovel point of the digger to break from the ground. It is of prime importance to note at this point that the caster wheels absorb the initial thrust of the load occasioned by the breaking of the digger shovel from the ground. As the distance between the box beam 52 and the lifting member 48 is increased due to the continued hydraulic action, the supports 45 and their rigid structure continue to raise and the links 66 thereby are also pulled upwardly. The toggle arrangement of the links 66 and structure 67 causes lifting of the rectangular structure 67 and causes the side members 68 and the L-shaped angles 70 to move upwardly until they come in contact and cradle the transversely extending portion of the yoke 61. It can be seen that the caster wheels are now rigidly cradled and all teetering action ceases. The forward portion of the rectangular structure 67 is at all times bearing upon the upper surface of the draft member or draw-bar extension 56 and by virtue of a roller 103 is free to roll on the upper flat surface of said draft member 56. As the rectangular structure 67 cradles and engages the yoke 61 on the caster wheel structure, the caster wheel structure is raised from the ground. As best seen in Fig. 2, the point of thrust is now no longer upon the caster wheel on the ground but is upon the member 56 and the drawbar 14 of the tractor. The caster wheel is effective to absorb the extreme and severe load occasioned in breaking the shovel from the ground. As the shovel is free from the ground, however, the load is thereupon shifted to the member 56 by virtue of the linkage arrangement of the rectangular structure 67. It should be especially noted, as being of prime importance, that the digger shovel is raised substantially vertically from the ground and by virtue of the non-parallel links 53 and 54 between the box beam 52 and lifting member 48 the digger is not moved substantially closer to the tractor upon lifting. Since the tip of the digger shovel rotates in a slight arc, the radius point of which is on the axle of the wheel 23, there is a slight movement of the tip of the shovel closer to the tractor, but this movement is negligible. Therefore the hydraulic mechanism utilized is required only to lift the digger from the ground and is not required to assume or overcome draft forces which would be occasioned by a jack-knife toggle link, or parallel link construction. In view of the non-parallel link construction between the box beam 52, the longitudinal lifting member 48 and the supports 45, movement between said members is both, longitudinal and vertical. As the potato digger is raised from the ground, the non-parallel linkage affords vertical movement without necessitating a decrease in the longitudinal distance between the axis of the wheels of the tractor and the wheels of the potato digger. Stated in another manner, the non-parallel linkage construction is effective to provide movement of the box beam 52 forwardly during lifting. Therefore, this movement compensates for any fore-shortening of the distance between the digger and the tractor which would ordinarily result in lifting. Thus the lifting means is not required to assume heavy draft forces.

As the potato digger is raised from the position shown in Fig. 1 to the position shown in Fig. 2, the lifting links 74 operate to rotate the plates 75 in a counter-clockwise direction about their pivotal point 76 on the bracket 77. The counter-clockwise rotation actuates the link 86 to move forwardly thereupon causing the link 87 to engage the transverse pin 89 and thereby moving the vertical members 90 forwardly. This will rotate the shaft 91, thereby causing forward movement of the links 93 which are attached to the adjustable discharge section 28. The discharge section 28 thereupon pivots at its pivotal point 30 in a counter-clockwise manner, thus raising the rearmost end of the discharge section to the position indicated by phantom lines in Fig. 1. The section must, of course, be raised to this position to permit raising of the digger shovel.

When the operator wishes to utilize the hydraulic control for gauging the depth working position of the digger shovel 27, the discharge section 28 is thus also automatically adjusted. During this operation, the shaker conveyor is, of course, in operation and the drive mechanism therefor is functioning. It is extremely desirable therefore that the telescoping members 40 remain in a substantial straight line drive position with respect to the gear box 36, thus assuring efficient driving motion. Since the gear box 36 is pivotally mounted between the downwardly extending leg of the bail element 31 and the vertical member 37, this straight line driving action is accomplished since the gear box is free to rotate despite any angular movement of the discharge section 28 about its pivotal point 30. Stated in another manner, despite the height adjustment of the discharge section 28, the telescoping members 40 remain in a substantial longitudinal straight line drive by virtue of the pivotal connection between the gear box and the discharge section.

The shields 40' are also in telescoping engagement and rigidity of the telescoping members 40 is accomplished by virtue of channels 41' and 43' which are also in telescopic engagement.

The potato digger 20 may also be raised or the depth may be adjusted by means of the manual wheel 82. Rotation of the wheel 82 causes upward movement of the link 84 until it engages the transverse pin 85 extending through the plate 75. Continued upward movement of the link 84 rotates the plate 75 in a counterclockwise direction, thereby urging the lifting links 74 downwardly in the same manner as is accomplished by the hydraulic cylinder 71. This, of course, raises and lowers the discharge section 28 in the same manner as previously described.

The position of the lost motion loop 88 with respect to the pin 89 determines at what point the discharge section 28 is to be raised upon raising of the potato digger shovel 27. The crank arm 96 can be utilized to regulate the position of the discharge section 28 and may also be used for independently lifting said discharge rear section with respect to the digger shovel of the potato digger.

In the modification shown in Figs. 7 and 8, the lifting action of the draft beam 52 with respect to the supports 45 is the same as above stated. Downward pressure by the piston rod 71' forces the beam 52 and the supports 45 away from one another, the non-parallel linkage operating to raise the digger shovel in a substantially vertical line. The initial load in breaking the digger from the ground is taken by the wheel 107. Continued raising movement of the supports and the digger shovel causes opening of the toggle links 112 and 113 until the stops 114, as best shown in Fig. 8, limit further opening of said links. At this point the links are effective to lift the wheel 107 from the ground and the lifting load is thereupon taken in the U-shaped frame 103 and the tractor drawbar 14.

It is now apparent that a unique lifting and adjusting structure for gauging and cutting the digging depth and raising the potato digger shovel has been accomplished. By virtue of this construction the potato digger shovel is raised in a substantially vertical direction without the necessity of simultaneously drawing the implement closer to the tractor. Thus, in effect, the lifting means employed is required to exert only a lifting pressure and is not required to assume draft loads during operation.

In view of the novel caster means employed, the potato digger implement is provided with a maximum amount of maneuverability despite varying ground contour conditions. By virtue of the single and central pivotal connection of the caster wheel and yoke, ease in turning is also facilitated. Upon lifting, the greatest load encountered in breaking the digger shovel from the ground is also initially taken and assumed by the caster wheel structure.

As has been clearly set forth, an efficient and practical means has been provided to simultaneously raise and lower a discharge section of the potato digger and in view of the unique universal drive construction, in conjunction with the manner of mounting the main gear drive box, a maximum and efficient drive is established during all the positions the adjustable discharge section may take during the operation of the implement.

It is to be understood that additional changes and modifications may be made without departing from the spirit of the invention as disclosed and as defined in the appended claims.

What is claimed is:

1. For a trailing implement having a longitudinally extending frame pivotally supported on ground wheels, and a ground engaging means connected at one end to the frame and pivotally movable with the frame with respect to the ground; a lifting mechanism adapted to be connected to the longitudinally extending frame and to the draw-bar of a tractor comprising, a draft frame adapted to be connected to the implement frame, said draft frame including a longitudinally extending lifting member, a longitudinally extending draft beam disposed below the lifting member, a link pivotally connected to said draft beam and to said lifting member, a relatively longer second link pivotally connected to said draft beam and to said lifting member, said links being positioned in relative non-parallel relation, means adapted to pivotally connect the draft beam to the draw-bar of a tractor, and adjusting means connected between the draft beam and the longitudinal lifting member whereby the beam and the lifting member may be relatively moved apart thereby raising said draft frame whereby an implement frame connected to said draft frame may also be raised.

2. For a trailing implement having a longitudinally extending frame pivotally supported on ground wheels, and a ground engaging means connected at one end to the frame and pivotally movable with the frame with respect to the ground; a lifting mechanism adapted to be connected to the longitudinally extending frame and to the draw-bar of a tractor comprising, a draft frame adapted to be connected to the implement frame, said draft frame including a longitudinally extending lifting member, a longitudinally extending draft beam disposed below the lifting member, a short link pivotally connected to the draft beam and to the lifting member, a relatively longer link pivotally connected to the draft beam and to the lifting member forwardly of the short link and in angular relation with respect thereto whereby said links are positioned in non-parallel relation, means adapted to pivotally connect the draft beam to the draw-bar of a tractor, said means including a draw-bar extension pivotally connected to the draft beam, and a fluid extensible means connected between the draft beam and the lifting member whereby upon extension of the extensible means said draft beam and lifting member are moved apart thereby raising the draft frame whereby an implement frame connected to said draft frame may also be raised without substantially changing the longitudinal spacing between a tractor and the axle of the implement frame.

3. For a trailing implement having a longitudinally extending frame pivotally supported on ground wheels, and a ground engaging shovel connected at one end of the frame and pivotally movable with the frame with respect to the ground; a lifting mechanism adapted to be connected to the longitudinally extending frame and to the draw-bar of a tractor comprising, a draft frame adapted to be connected to the implement frame, said draft frame including a longitudinally extending lifting member, a longitudinally extending draft beam positioned below the lifting member, non-parallel links pivotally connected to the draft beam and to the lifting mechanism, a castering wheel structure connected to the draft beam for supporting the same, means pivotally connected to the draft beam, said means being adapted to connect said draft beam to the draw-bar of a tractor, and a fluid extensible means connected between the draft beam and the lifting member for moving said member and the beam relatively apart whereby the draft frame and an implement frame adapted to be connected thereto are raised without substantially changing the longitudinal spacing between a tractor and the axle of the implement frame.

4. For a trailing implement having a longitudinally extending frame pivotally supported on ground wheels, and a ground engaging shovel connected at one end of the frame and pivotally movable with the frame with respect to the ground; a lifting mechanism adapted to be connected to the longitudinally extending frame and to the draw-bar of a tractor comprising, a draft frame adapted to be connected to the implement frame, said draft frame including a longitudinally extending lifting member, a longitudinally extending draft beam positioned below the lifting member, non-parallel links pivotally connected to the draft beam and to the lifting mechanism, a wheel structure connected to the draft beam for supporting the same, means pivotally connected to the draft beam, said means including a draw-bar extension adapted to connect said draft beam to the draw-bar of a tractor, and a fluid extensible means connected between the draft beam and the lifting member for moving said member and the beam relatively apart whereby the draft frame and an implement frame adapted to be connected thereto are raised without substantially changing the longitudinal spacing between a tractor and the axle of the implement frame.

5. For a trailing implement having a longitudinally extending frame pivotally supported on ground wheels, and a ground engaging shovel connected at one end of the frame and pivotally movable with the frame with respect to the ground; a lifting mechanism adapted to be connected to the longitudinally extending frame and to the draw-bar of a tractor comprising, a draft frame adapted to be connected to the implement frame, said draft frame including a longitudinally extending lifting member, a longitudinally extending draft beam positioned below the lifting member, non-parallel links pivotally connected to the draft beam and to the lifting mechanism, a wheel structure connected to the draft beam for supporting the same, means pivotally connected to the draft beam, said means including a draw-bar extension adapted to connect said draft beam to the draw-bar of a tractor, a fluid extensible means connected between the draft beam and the lifting member for moving said member and the beam relatively apart whereby the draft frame and an implement frame adapted to be connected thereto are raised without substantially changing the longitudinal spacing between a tractor and the axle of the implement frame, and a lost-motion connection between said draft frame and said castering wheel structure whereby the castering wheel structure is raised upon the lifting of said draft frame to a predetermined height.

6. For a trailing implement having a longitudinally extending frame pivotally supported on ground wheels, and a ground engaging shovel connected at one end of the frame and pivotally movable with the frame with respect to the ground; a lifting mechanism adapted to be connected to the longitudinally extending frame and to the draw-bar of a tractor comprising, a draft frame adapted to be connected to the implement frame, said draft frame including a longitudinally extending lifting member, a longitudinally extending draft beam positioned below the lifting member, non-parallel links pivotally connected to the draft beam and to the lifting mechanism, a wheel structure connected to the draft beam for supporting the same, means pivotally connected to the draft beam, said means including a draw-bar extension adapted to connect said draft beam to the draw-bar of a tractor, a fluid extensible means connected between the draft beam and the lifting member for moving said member and the beam relatively apart whereby the draft frame and an implement frame adapted to be connected thereto are raised without substantially changing the longitudinal spacing between a tractor and the axle of the implement frame, and a toggle linkage construction including one link pivotally connected to said draft frame and a second link pivotally connected to the draw-bar extension, said toggle linkage construction being adapted to engage and raise said castering wheel construction upon the lifting of said draft frame to a predetermined height.

7. For a trailing implement having a longitudinally extending frame pivotally supported on ground wheels and a ground engaging shovel connected at one end of the frame and movable with the frame with respect to the ground; a lifting mechanism adapted to be connected to the longitudinally extending frame and to the draw-bar of a tractor comprising, a draft frame including a longitudinally extending lifting member, a longitudinally extending draft beam positioned below the lifting member, non-parallel links pivotally connected to the draft beam and to the lifting member, a castering wheel structure including a yoke extending transversely of the draft beam and pivotally connected thereto, castering wheels pivotally connected to the yoke in transversely spaced relation and adapted to support the draft beam with respect to the ground, a draw-bar extension pivotally connected to the draft beam and adapted to connect to the draw-bar of a tractor, and adjustable means connected to the draft beam and to the lifting member for moving the beam and the member relatively apart thereby initially raising the lifting member with the draft beam supported on said castering wheel structure.

8. For a trailing implement having a longitudinally extending frame pivotally supported on ground wheels and a ground engaging shovel connected at one end of the frame and movable with the frame with respect to the ground; a lifting mechanism adapted to be connected to the longitudinally extending frame and to the draw-bar of a tractor comprising, a draft frame including a longitudinally extending lifting member, a longitudinally extending draft beam positioned below the lifting member, non-parallel links pivotally connected to the draft beam and to the lifting member, a castering wheel structure including a yoke extending transversely of the draft beam and pivotally connected thereto, castering wheels pivotally connected to the yoke in transversely spaced relation and adapted to support the draft beam with respect to the ground, a draw-bar extension pivotally connected to the draft beam and adapted to connect to the draw-bar of a tractor, adjustable means connected to the draft beam and to the lifting member for moving the beam and the member relatively apart thereby initially raising the lifting member with the draft beam supported on said castering wheel structure, and a toggle linkage construction including one link pivotally connected to said draft frame and a second link pivotally connected to the draw-bar extension, said toggle linkage construction being adapted to engage and raise said castering wheel construction upon the lifting of said draft frame to a predetermined height.

9. For a trailing implement having a longitudinally extending frame pivotally supported on ground wheels and a ground engaging shovel connected at one end of the frame and movable with the frame with respect to the ground; a lifting mechanism adapted to be connected to the longitudinally extending frame and to the draw-bar of a tractor comprising, a draft frame including a longitudinally extending lifting member, a longitudinally extending draft beam positioned below the lifting member, non-parallel links pivotally connected to the draft beam and to the lifting member, a castering wheel structure including a yoke extending transversely of the draft beam and pivotally connected thereto, castering wheels pivotally connected to the yoke in transversely spaced relation and adapted to support the draft beam with respect to the ground, a draw-bar extension pivotally connected to the draft beam and adapted to connect to the draw-bar of a tractor, adjustable means connected to the draft beam and to the lifting member for moving the beam and the member relatively apart thereby initially raising the lifting member with the draft beam supported on said castering wheel structure, and a lost-motion connection between said lifting member and said castering wheel structure whereby the castering wheel structure is raised upon the lifting of said draft frame to a predetermined height.

10. For a trailing implement having a longitudinally extending frame pivotally supported on ground wheels and a ground engaging shovel connected at one end of the frame and movable with the frame with respect to the ground; a lifting mechanism adapted to be connected to the longitudinally extending frame and to the draw-bar of a tractor comprising, a draft frame including a longitudinally extending lifting member, a longitudinally extending draft beam positioned below the lifting member, non-parallel links pivotally connected to the draft beam and to the lifting member, a castering wheel structure including a yoke extending transversely of the draft beam and pivotally connected thereto, castering wheels pivotally connected to the yoke in transversely spaced relation and adapted to support the draft beam with respect to the ground, a draw-bar extension pivotally connected to the draft beam and adapted to connect to the draw-bar of a tractor, adjustable means connected to the draft beam and to the lifting member for moving the beam and the member relatively apart thereby initially raising the lifting member with the draft beam supported on said castering wheel structure, a first link pivotally connected to said draft frame, and a second link pivotally connected to said first link and to said draw-bar extension, said links being pivotally movable upon movement of said draft frame whereby said second link engages the yoke of said castering wheel structure and raises said structure free of the ground.

LEWIS E. SMITH.

REFERENCES CITED

The following references are of record in the file of this patent:

UNITED STATES PATENTS

| Number | Name | Date |
| --- | --- | --- |
| 1,888,504 | Johnson et al. | Nov. 22, 1932 |
| 1,991,543 | Cook | Feb. 19, 1935 |
| 2,081,346 | Altgelt | May 25, 1937 |
| 2,146,898 | Johnson | Feb. 14, 1939 |
| 2,204,241 | Young | June 11, 1940 |
| 2,369,437 | Court | Feb. 13, 1945 |
| 2,410,918 | Acton | Nov. 12, 1946 |